United States Patent
Tao

(10) Patent No.: US 9,256,736 B2
(45) Date of Patent: Feb. 9, 2016

(54) METHOD AND SYSTEM FOR MONITORING WEBPAGE MALICIOUS ATTRIBUTES

(71) Applicant: TENCENT TECHNOLOGY (SHENZHEN) COMPANY LIMITED, Guangdong (CN)

(72) Inventor: Sinan Tao, Guangdong (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/227,158

(22) Filed: Mar. 27, 2014

(65) Prior Publication Data

US 2014/0215631 A1 Jul. 31, 2014

Related U.S. Application Data

(63) Continuation of application No. PCT/CN2012/081656, filed on Sep. 20, 2012.

(30) Foreign Application Priority Data

Sep. 28, 2011 (CN) .......................... 2011 1 0298003

(51) Int. Cl.
*G06F 21/55* (2013.01)
*H04L 29/06* (2006.01)

(52) U.S. Cl.
CPC ............ *G06F 21/55* (2013.01); *H04L 63/1441* (2013.01); *H04L 63/1466* (2013.01); *H04L 63/1483* (2013.01)

(58) Field of Classification Search
CPC . G06F 21/55; H04L 63/1441; H04L 63/1483; H04L 63/1466
See application file for complete search history.

(56) References Cited

U.S. PATENT DOCUMENTS 8,180,761 B1 * 5/2012 Cooley .............. G06F 17/30864
707/709
8,521,667 B2 * 8/2013 Zhu et al. ........................ 706/13

(Continued)

FOREIGN PATENT DOCUMENTS

CN 101820366 A 9/2010

OTHER PUBLICATIONS

Davide Canali, Marco Cova, Giovanni Vigna, and Christopher Kruegel. 2011. Prophiler: a fast filter for the large-scale detection of malicious web pages. In Proceedings of the 20th international conference on World wide web (WWW '11). ACM, New York, NY, USA, 197-206.*

(Continued)

*Primary Examiner* — Jason K. Gee
*Assistant Examiner* — Zhimei Zhu
(74) *Attorney, Agent, or Firm* — Morrison & Foerster LLP

(57) ABSTRACT

A method for monitoring a malicious attribute of a webpage is disclosed. The method includes the following steps: acquiring webpage query requests submitted by a plurality of clients; crawling a webpage based on the webpage query requests and acquiring crawled webpage contents; counting up a referenced value of a URL based on the webpage contents; calling a predetermined detection program to detect a malicious attribute of the URL based on the a referenced value of the URL. The accuracy of detection can be improved by using the method for monitoring a malicious attribute of a webpage provided in the present disclosure. Furthermore, a system for monitoring a malicious attribute of a webpage is further disclosed.

18 Claims, 4 Drawing Sheets

(56) References Cited

U.S. PATENT DOCUMENTS

| | | | |
|---|---|---|---|
| 2009/0198673 A1 | 8/2009 | Gao et al. | |
| 2011/0087769 A1* | 4/2011 | Holmes et al. | 709/224 |
| 2012/0060221 A1* | 3/2012 | Gerber | G06F 21/56 726/25 |

OTHER PUBLICATIONS

Danny Sullivan, "What Is Google PageRank? A Guide for Searchers & Webmasters", Dec. 25, 2008, Retrieved from <http://web.archive.org/web/20081225051416/http://searchengineland.com/what-is-google-pagerank-a-guide-for-searchers-webmasters-11068>, retrieved on Apr. 13, 2015.*

Junghoo Cho, Hector Garcia-Molina, and Lawrence Page. 1998. Efficient crawling through URL ordering. In Proceedings of the seventh international conference on World Wide Web 7 (WWW7), Philip H. Enslow, Jr. and Allen Ellis (Eds.). Elsevier Science Publishers B. V., Amsterdam, The Netherlands, The Netherlands, 161-172.*

International Search Report and Written Opinion received for PCT Patent Application No. PCT/CN2012/081656, mailed on Dec. 27, 2012, 24 pages (15 page of English Translation and 9 pages of Official Copy).

Wang, Yingjie, "A Study on the Client Honeypot System Based on the Malicious Web Detection", Chinese Master's Theses Full-text Database, Information Science and Technology, No. 11, Nov. 15, 2008, 62 pages(English Abstract submitted).

* cited by examiner

METHOD AND SYSTEM FOR MONITORING WEBPAGE MALICIOUS ATTRIBUTES

CROSS-REFERENCE TO RELATED PATENT APPLICATION

This application is a continuation application of an International Application No. PCT/CN2012/081656, filed on Sep. 20, 2012, entitled "METHOD AND SYSTEM FOR MONITORING WEBPAGE MALICIOUS ATTRIBUTES" by Sinan TAO, which claims the priority from the Chinese patent application No. CN 201110298003.4, filed on Sep. 28, 2011, the disclosures for which are hereby incorporated herein in their entireties by reference.

FIELD OF THE INVENTION

The present invention relates generally to the field of Internet technology, and more particularly to a method and a system for monitoring webpage malicious attributes.

BACKGROUND OF THE INVENTION

With the development of the Internet technology, there are more and more pornographic websites, fraud phishing websites and equestrian websites, which greatly threaten the security of information accessed by users on the Internet. Therefore, it needs to detect whether a malicious attribute exits in a webpage before page contents have been acquired and parsed in a browser, if the webpage has a malicious attribute, the user is prompted that the webpage current accessing is malicious webpage, so as to safeguard the Internet surfing of the user.

Traditional methods for detecting malicious attribute of a webpage includes signature-based detecting, behavior based detecting, sandbox filtering technique and honeypot. Among them, the principle of signature-based detecting likes this: signatures are stored in a signatures library by extracting samples of malicious codes and analysing the signatured instruction sequence of the samples; scanned documents are compared with the signatures library when detect a malicious attribute of a webpage; if there is a document fragment that match signatures, the detected webpage has a malicious attribute. The behavior based detecting distinguishes by detecting a behavior of a program, such as add a item to registry startup entries, modify content under system folder and call special or rarely-seen API functions in abnormal frequency, if such behaviors are detected, the detected webpage has a malicious attribute.

Because most of malicious codes in malicious webpages are written by JavaScript, these malicious JavaScript codes are obfuscated encrypted to evade detecting. In the face of obfuscated encrypted JavaScript odes, the most effective approach is sandbox filtering technique, i.e., parse and execute JavaScript codes in webpages in a virtual environment by built-in HTML and JavaScript parsing engine, and keep track of the behavior of JavaScript codes in parsing process, such as creating Active controls and concentrating large amount of alloc, the detected webpage has a malicious attribute.

Honeypot technique, including client honeypots, means that monitor abnormality or not by actively opening client software to access server, aiming at client software's possible security weakness, so as to further achieve the goal of research study and providing security. Client honeypots combine honeypot technique with spider technique predominantly for Web browser and E-mail client, and it can seek potential malicious software that executes by client software by spiders crawling network-based URL.

However, as the technique of malicious codes written by hackers improves, malicious codes are becoming more and more subtle, while traditional methods for monitoring a malicious attribute of a webpage are fairly simple that makes it hard to detect new malicious codes in the present in time, and the malicious webpage can cause certain harms before found features therein, thus traditional methods for monitoring a malicious attribute of a webpage have low accuracy.

SUMMARY OF THE INVENTION

Based on the above, there is a need to provide a method for monitoring malicious attribute of a webpage with improved accuracy.

A method for monitoring a malicious attribute of a webpage includes the steps of:
 acquiring webpage query requests submitted by a plurality of clients;
 crawling a webpage based on the webpage query requests and acquiring crawled webpage contents;
 counting up a referenced value of a uniform resource locator (URL) based on the webpage contents; and
 calling a predetermined detection program to perform malicious attribute detection of the URL based on the a referenced value of the URL.

Preferably, after the step of acquiring crawled webpage contents, the method may further includes:
 parsing the webpage contents and extracting citation information of external links in the webpage contents; and
 the step of counting up the referenced value of the URL based on the webpage contents includes counting up the referenced value of the URL based on the citation information of the external links.

Preferably, the step of counting up a referenced value of a URL based on the citation information of external links may include classifying URLs by domain name based on domain information, and counting up referenced values of URLs under different domain categories based on citation information of external links.

Preferably, the method may further include a step of setting the corresponding relationship between detection priorities and a combination of one or more predetermined detection programs; and
 the step of calling a predetermined detection program to perform malicious attribute detection of the URL based on the a referenced value of the URL may include determining the detection priorities of the URL based on the referenced value of the URL, and calling a corresponding combination of one or more predetermined detection programs to perform malicious attribute detection of the URL based on the detection priorities.

Preferably, after the step of acquiring crawled webpage contents, the method may further include:
 parsing the webpage contents and extracting data to be detected in the webpage contents; and
 the step of calling a predetermined detection program to perform malicious attribute detection of the URL based on the referenced value of the URL may include calling a predetermined detection program to perform malicious attribute detection of the data to be detected in the webpage contents corresponding to the URL based on the referenced value of the URL.

According to another further aspect of the invention, a system for monitoring malicious attribute detection of a webpage with improved accuracy is provided.

The system for monitoring a malicious attribute of a webpage includes a server configured to interact with a plurality of clients, and the server includes:
an interface module, configured to acquire webpage query requests submitted by a plurality of clients;
a webpage crawling module, configured to crawl a webpage based on the webpage query requests and acquire crawled webpage contents;
a heat statistics module, configured to count up a referenced value of a uniform resource locator (URL) based on the webpage contents; and
a detection module, configured to call a predetermined detection program to perform malicious attribute detection of the URL based on the referenced value of the URL.

Preferably, the server may further include a webpage parsing module which is configured to parse the webpage contents and extract citation information of external links in the webpage contents; and
the heat statistics module is further configured to count up a referenced value of a URL based on the citation information of external links.

Preferably, the heat statistics module is further configured to classify URLs by domain name based on domain information, and count up a referenced value of URLs under different domain categories based on citation information of external links.

Preferably, the detection module is further configured to set the corresponding relationship between detection priorities and a combination of one or more predetermined detection programs, and the detection module is further configured to determine the detection priorities of the URL based on the referenced value of the URL, and call a corresponding combination of one or more predetermined detection programs to perform malicious attribute detection of the URL based on the detection priorities.

Preferably, the webpage crawling module is further configured to parse the webpage contents and extract data to be detected in the webpage contents; and
the detection module is further configured to call a predetermined detection program to perform malicious attribute detection of the data to be detected in the webpage contents corresponding to the URL based on the referenced value of the URL.

The above method and system for monitoring malicious attribute of a webpage, acquires webpage query requests submitted by a plurality of clients, crawls webpages and acquires crawled webpage contents based on the webpage query requests, counts up a referenced value of a URL based on the webpage contents and calls a predetermined detection program to detect malicious attribute of the URL based on the referenced value of the URL. Because the heat of a webpage referenced can be reflected by a referenced value of the URL, different predetermined detection programs can be called to detect malicious attribute of a URL based on different referenced values, and thus the accuracy of detection can be improved.

DETAILED DESCRIPTION OF THE PREFERRED EMBODIMENTS

Figure 1:
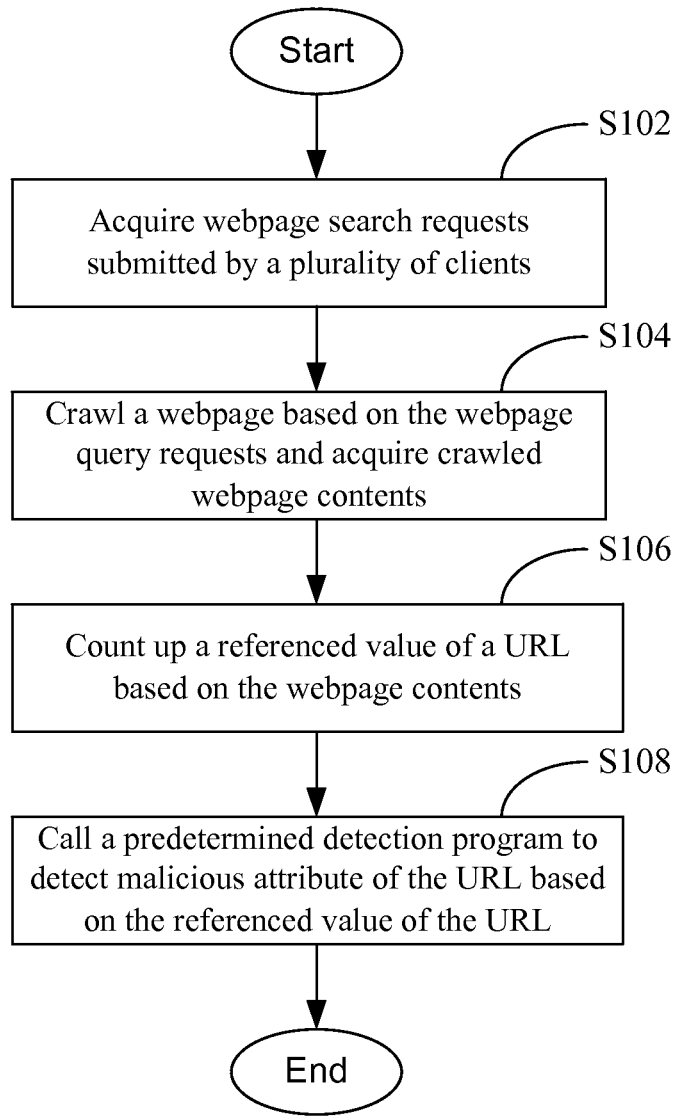
FIG. 1 shows a flow diagram of a method for monitoring a malicious attribute of a webpage according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As shown in FIG. 1, a method for monitoring a malicious attribute of a webpage according to one embodiment of the present invention includes the following steps.

Step S102: acquire webpage query requests submitted by a plurality of clients.

Step S104: crawl a webpage based on the webpage query requests and acquire crawled webpage contents.

Step S106: count up a referenced value of a uniform resource locator (URL) based on the webpage contents.

The webpage contents acquired by webpage crawling include the information of the webpage referencing other URLs, and a referenced value of the URL can be obtained by counting up a lot of the information.

Step S108: call a predetermined detection program to detect a malicious attribute of the URL based on the referenced value of the URL.

The heat of a webpage referenced can be reflected by a referenced value of a URL, the higher the referenced value is, the higher attention the webpage is. By counting up a referenced value of a URL in the present invention, a predetermined stronger detection program can be called to detect malicious attribute for the URL with a higher referenced value, and the present invention can combine various detection programs to improve the accuracy of the detection.

Figure 2:
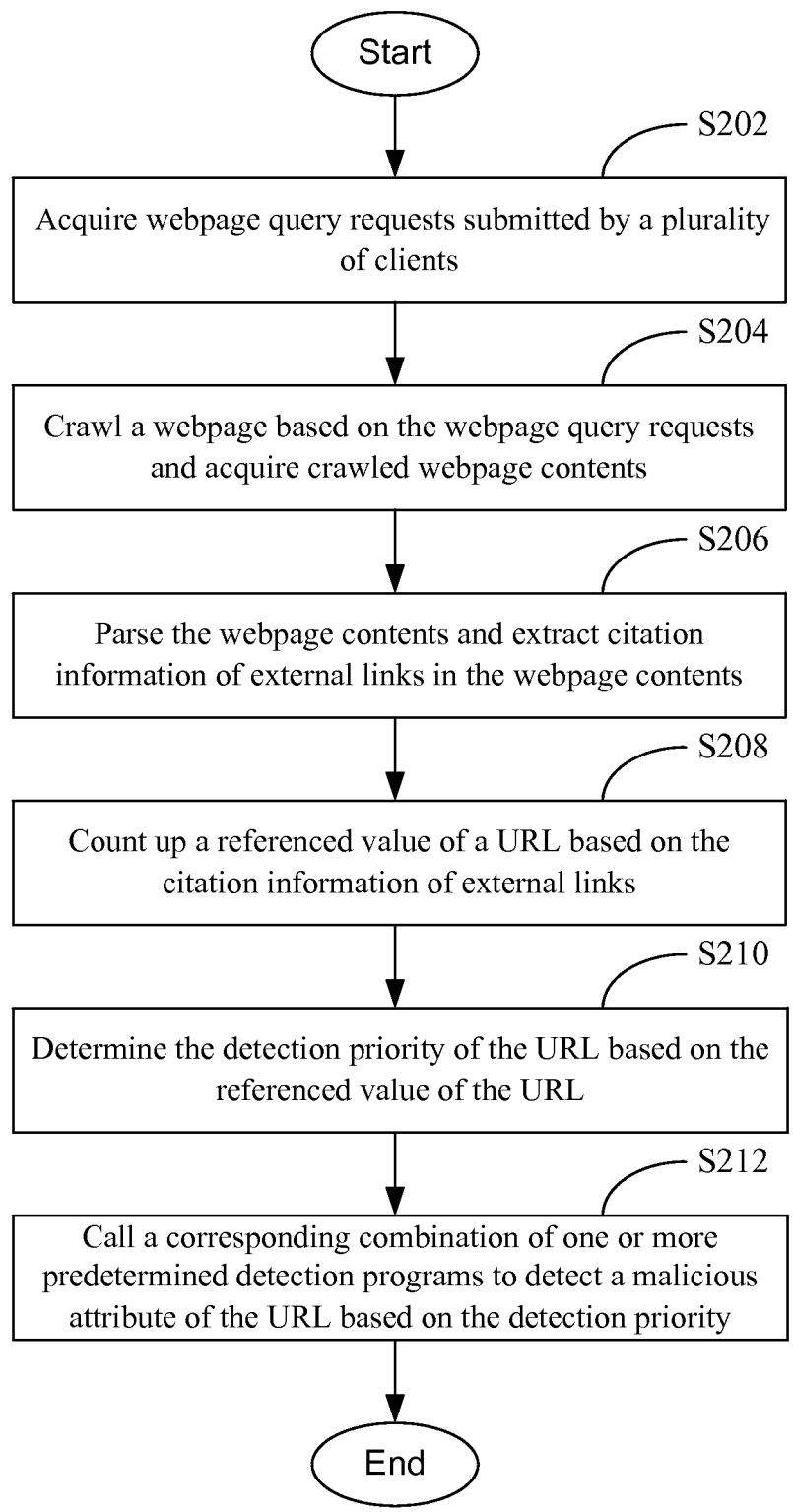
FIG. 2 shows a flow diagram of a method for monitoring a malicious attribute of a webpage according to one embodiment of the present invention.

In one embodiment, as shown in FIG. 2, a method for monitoring a malicious attribute of a webpage includes the following steps.

Step 202: acquire webpage query requests submitted by a plurality of clients.

In this embodiment, the client submits a webpage query request to a server when the webpage is opened by a browser, and the webpage query request includes a URL that need to be queried. Because there are thousands of users who browse webpages, a large number of webpage query requests can be acquired. In addition, the client can also be a cloud client, and it can acquire webpage query requests submitted by a plurality of cloud clients.

Step S204: crawl a webpage based on the webpage query requests and acquire crawled webpage contents.

Because the webpage query requests acquired are massive, in one embodiment, the webpage query requests can be distributed to different webpage crawling modules for webpage crawling before the step S204, and this distributed manner can improve the efficiency of crawling a webpage.

Webpage crawling is to acquire a URL from a webpage query request, crawl and acquire webpage contents of the URL, then continue to crawl by extracting new URL from the present webpage, and build indexes for the crawled webpage contents, which is convenient for inquiry and query afterwards. Webpage contents acquired by crawling are composed of HTML labels.

Step S206: parse the webpage contents and extract citation information of external links in the webpage contents.

The webpage contents that are acquired by webpage crawling include the information of the webpage referencing other URLs. For example, other URLs are referenced by "<iframe src="url">", other js (JavaScript) links are referenced by "<script src="http://www.qq.com/a.js">", and such information is citation information of external links. The citation information of external links is configured to count up a referenced value of a URL afterwards.

Step S208: count up a referenced value of a URL based on the citation information of external links.

A referenced value of a URL represents the heat of the URL. The higher the referenced value is, the higher the heat is, and the higher attention the webpage is. A referenced value of a URL can be the number of citations of URL, and also can be the percentage of the number of citations of URL taking in all of the number of citations.

In one embodiment, URLs can be classified by domain name based on domain information, and a referenced value of URLs under different domain categories can be counted up based on citation information of external links. For example, count up the referenced value of all URLs under the domain name of "qq.com".

Step S210: determine the detection priority of the URL based on the referenced value of the URL.

In one embodiment, the corresponding relationship between detection priorities and a combination of one or more predetermined detection programs can be set. It needs to call a corresponding combination of one or more predetermined detection programs in corresponding with different detection priorities to detect malicious attribute of the URL.

In a preferred embodiment, a range of referenced values can be set to correspond with a detection priority. URLs can be sorted by referenced values after the referenced values of URLs have been counted up. For example, the top 10,000 URLs in the sequence correspond with the highest detection priority, the next 10,000 URLs in the sequence correspond with the next-highest detection priority, and so forth.

Step S212: call a corresponding combination of one or more predetermined detection programs to detect malicious attribute of the URL based on the detection priorities.

In one embodiment, after the step of S204, the method further includes: parsing the webpage contents and extracting data to be detected in the webpage contents. Specifically, data to be detected includes executable js code (JavaScript code), page title, copyright information, etc. In this embodiment, the step of calling a predetermined detection program to detect a malicious attribute of the URL based on the a referenced value of the URL includes calling a predetermined detection program to detect a malicious attribute of the data to be detected in the webpage contents corresponding to the URL based on the a referenced value of the URL.

In one embodiment, a predetermined detection program can be signature-based detection program, behavior based detection program, a detection program with sandbox filtering technique or a detection program with honeypot. The corresponding relationship between detection priorities and a combination of one or more predetermined detection programs has been pre-set. For example, for a URL with a higher referenced value, which has a higher heat, the corresponding detection priority is also higher, and it can use a detection program with sandbox filtering technique, a detection program with honeypot, or a combination of both, to detect a malicious attribute; for a URL with a lower detection priority, it can use signature-based detection program to detect a malicious attribute of the URL. In conclusion, the present invention can combine various detection programs and call different detection programs based on the heat of URL, to ensure the accuracy of the detection.

Specifically, the different data is detected by different detection programs. Acquire the URL and the corresponding data to be detected, and call a predetermined detection program to detect a malicious attribute of the URL based on malicious properties of the URL. In one embodiment, the detection result is returned to the user after detecting a malicious attribute of the URL. For example, the user is prompted by a popped tooltip that the webpage has malicious codes.

Figure 3:
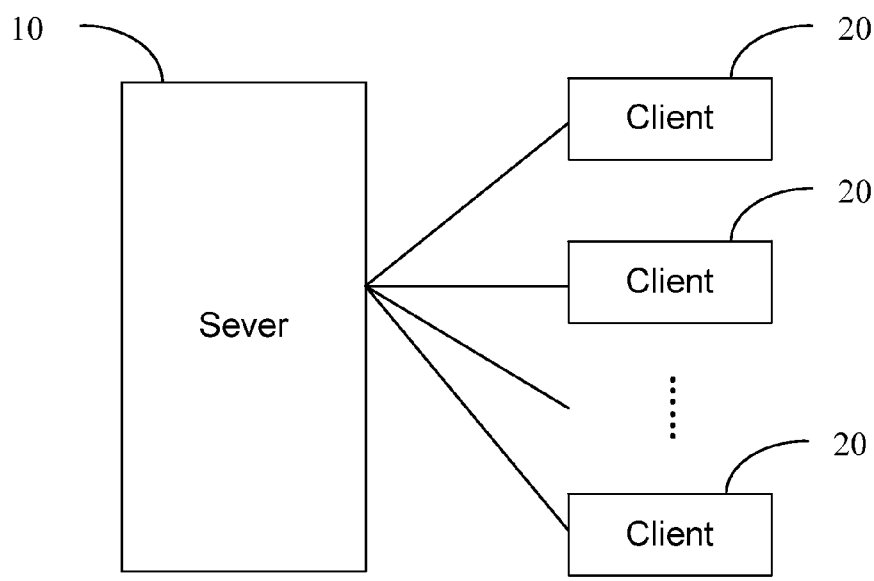
FIG. 3 shows a structure diagram of a system for monitoring a malicious attribute of a webpage according to one embodiment of the present invention.
Figure 4:
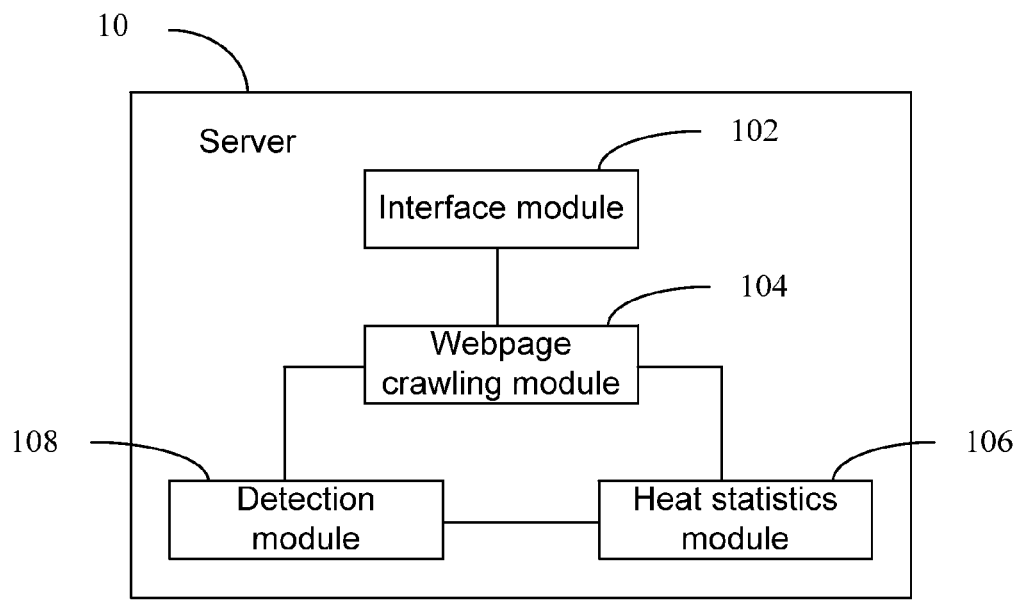
FIG. 4 shows a structure diagram of a server of a system for monitoring a malicious attribute of a webpage according to one embodiment of the present invention.

As shown in FIG. 3, a system for monitoring a malicious attribute of a webpage is disclosed. The system includes a server 10, and a plurality of clients 20 interacting with the server 10. As shown in FIG. 4, in one embodiment, the server 10 includes an interface module 102, a webpage crawling module 104, a heat statistics module 106 and a detection module 108.

The interface module 102 is configured to acquire webpage query requests submitted by a plurality of clients 20. It will be appreciated that the server 10 can be a cloud server, and the corresponding client 20 can be a cloud client. The webpage query request includes a URL that need to be queried. Because there are thousands of users who browse webpages, a large number of webpage query requests can be acquired by the interface module 102.

The webpage crawling module 104 is configured to crawl a webpage based on the webpage query requests and acquire crawled webpage contents. In one embodiment, a plurality of webpage crawling modules 104 are provided, and the server 10 may also include a data distribution module (not shown), by which the webpage query requests can be distributed to different webpage crawling modules 104 for webpage crawling.

The heat statistics module 106 is configured to count up a referenced value of a URL based on the webpage contents. The webpage contents acquired by webpage crawling include the information of the webpage referencing other URLs, and a referenced value of the URL can be obtained by counting up a lot of the information.

The detection module 108 is configured to call a predetermined detection program to detect a malicious attribute of the URL based on the referenced value of the URL.

Figure 5:
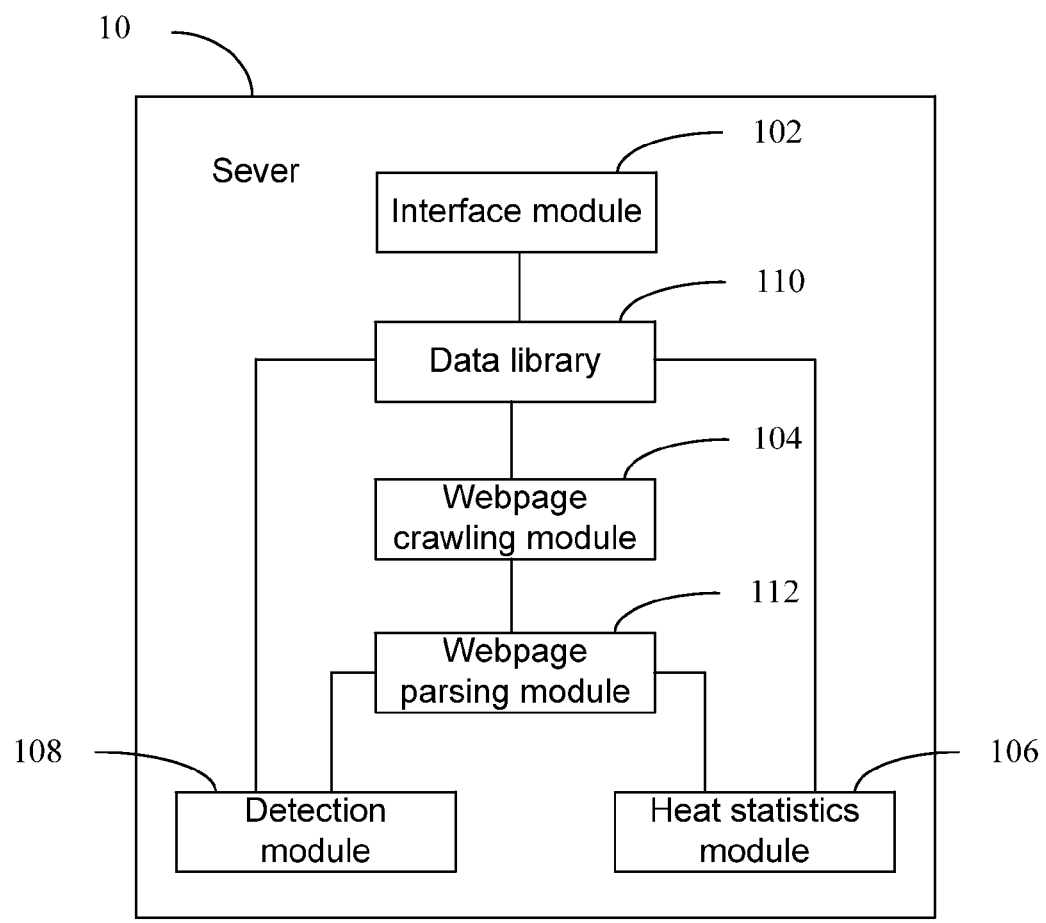
FIG. 5 shows a structure diagram of a server according to one embodiment of the present invention.

In another embodiment, as shown in FIG. 5, the server also includes a data library 110 configured to store the webpage query requests received by the interface module 102. In one embodiment, the data distribution module acquires webpage query requests from the data library 110, then distributes the webpage query requests to different webpage crawling modules 104. The webpage crawling module 104 acquires a URL from a webpage query request, crawls and acquires webpage contents of the URL, then continue to crawl by extracting new URL from the present webpage, and builds indexes for the crawled webpage contents, which is convenient for inquiry and query afterwards. Webpage contents acquired by crawling by the webpage crawling modules 104 are composed of HTML labels.

In one embodiment, as shown in FIG. 5, the server 10 further includes a webpage parsing module 112 which is configured to parse the webpage contents and extract citation information of external links in the webpage contents. In this embodiment, the heat statistics module 106 is also configured to count up a referenced value of a URL based on the citation information of external links.

The webpage contents that are acquired by webpage crawling include the information of the webpage referencing other URLs. For example, other URLs are referenced by "<iframe src="url">", other js (JavaScript) links are referenced by "<script src="http://www.qq.com/a.js">", and such information is citation information of external links. The citation information of external links is configured to count up a referenced value of a URL afterwards.

A referenced value of a URL is the heat of the URL that the higher the referenced value is, the higher the heat is, and the higher attention the webpage is. A referenced value of a URL can be the number of citations of URL, and also can be the percentage of the number of citations of URL taking in all of the number of citations. The referenced values counted up by the heat statistics module 106 can be stored in the data library 110.

In one embodiment, the heat statistics module 106 is further configured to classify URLs by domain name based on domain information, and count up referenced values of URLs under different domain categories based on citation information of external links.

In one embodiment, the detection module 108 is further configured to set the corresponding relationship between detection priorities and a combination of one or more predetermined detection programs. In this embodiment, the detection module 108 also can be configured to determine the detection priority of the URL based on the referenced value of the URL, and call a corresponding combination of one or more predetermined detection programs to detect a malicious attribute of the URL based on the detection priorities. Preferably, a range of referenced values can be set by the detection module 108 to correspond with a detection priority. URLs can be sorted by referenced values after the referenced values of URLs have been counted up by the detection module 108, then the detection priorities of URLs are determined based on the result of sorting.

In one embodiment, the webpage parsing module 112 is further configured to parse the webpage contents and extract citation information of external links in the webpage contents. In this embodiment, the detection module 108 is further configured to call a predetermined detection program to detect a malicious attribute of the data to be detected in the webpage contents corresponding to the URL based on the referenced value of the URL. Specifically, the data to be detected includes executable js code (JavaScript code), page title, copyright information, etc. The data to be detected extracted by the webpage parsing module 112 can be stored in the data library 110.

In one embodiment, a predetermined detection program can be signature-based detection program, behavior based detection program, a detection program with sandbox filtering technique or a detection program with honeypot. The corresponding relationship between detection priorities and a combination of one or more predetermined detection programs is set by the detection module 108. For example, for a URL with a higher referenced value, which has a higher heat, the corresponding detection priority is also higher, and it can use a detection program with sandbox filtering technique, a detection program with honeypot, or a combination of both, to detect a malicious attribute. For a URL with a lower detection priority, it can use signature-based detection program to detect a malicious attribute of the URL. Thus, the present invention can combine various detection programs and call different detection programs based on the heat of URL, to ensure the accuracy of the detection.

Specially, because different data is detected by different detection programs, the detection module 108 is configured to acquire the URL and corresponding data to be detected from the data library 110, and call a predetermined detection program to detect a malicious attribute of the URL based on malicious properties of the URL.

The above method and system for monitoring a malicious attribute of a webpage counts up a referenced value of URL, determines the detection priority of the URL, and calls a corresponding combination of one or more predetermined detection programs to detect a malicious attribute of the URL based on the detection priority of the URL. The present invention can combine various detection programs and call different detection programs based on the referenced value of URL, to ensure the accuracy of the detection.

It will be appreciated for a person skilled in the art that a portion or all processes in implementing the above embodiments can be achieved by hardware related to computer program control, the program can be stored in a readable storage medium in a computer, and when the program executes, it can includes the process of the above embodiments. The storage medium can be a diskette, an optical disk, read-only memory (ROM) or random access memory (RAM).

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defiled by the appended claims rather than the foregoing description and the exemplary embodiments described therein.

What is claimed is:

1. A method for monitoring a malicious attribute of a webpage, comprising:
    acquiring webpage query requests submitted by a plurality of clients;
    crawling the webpage based on the acquired webpage query requests and acquiring crawled webpage contents;
    counting up a referenced value of a uniform resource locator (URL) based on the crawled webpage contents; and
    calling a predetermined detection program based on the referenced value of the URL to perform malicious attribute detection of the URL.

2. The method of claim 1, further comprising:
    after acquiring crawled webpage contents, parsing the webpage contents and extracting citation information of external links in the webpage contents;
    wherein counting up the referenced value of the URL based on the webpage contents comprises:
    counting up the referenced value of the URL based on citation information of the external links.

3. The method of claim 2, wherein counting up the referenced value of the URL based on the citation information of the external links comprises: classifying URLs by domain name based on domain information, and counting up referenced values of the URLs under different domain categories based on the citation information of the external links.

4. The method of claim 1, further comprising:
setting a corresponding relationship between detection priorities and a combination of one or more predetermined detection programs;
wherein calling the predetermined detection program to perform malicious attribute detection of the URL comprises:
determining the detection priorities of the URL based on the referenced value of the URL; and
calling a corresponding combination of one or more predetermined detection programs based on the detection priorities to perform malicious attribute detection of the URL.

5. The method of claim 1, further comprising:
after acquiring crawled webpage contents,
parsing the webpage contents and extracting data to be detected in the webpage contents;
wherein calling a predetermined detection program based on the referenced value of the URL to perform malicious attribute detection of the URL comprises:
calling a predetermined detection program based on the referenced value of the URL to perform malicious attribute detection of contents referenced by the URL.

6. The method of claim 1, wherein the crawled web page is specified in a plurality of the acquired webpage query requests.

7. A system for monitoring a malicious attribute of a webpage, comprising:
a server, configured to interact with a plurality of clients;
wherein the server comprises one or more processors configured to:
acquire webpage query requests submitted by a plurality of clients;
crawl the webpage based on the acquired webpage query requests and acquire crawled webpage contents;
count up a referenced value of a uniform resource locator (URL) based on the crawled webpage contents; and
call a predetermined detection program based on the referenced value of the URL to perform malicious attribute detection of the URL.

8. The system of claim 7, wherein the one or more processors are further configured to:
parse the webpage contents and extract citation information of external links in the webpage contents;
count up a referenced value of the URL based on the citation information of external links.

9. The system of claim 8, wherein the one or more processors are further configured to:
classify URLs by domain name based on domain information;
count up referenced values of URLs under different domain categories based on citation information of the external links.

10. The system claim 8, wherein the one or more processors are further configured to:
parse the webpage contents and extract data to be detected in the webpage contents; and
call a predetermined detection program based on the referenced value of the URL to perform malicious attribute detection of contents referenced by the URL.

11. The system of claim 7, wherein the one or more processors are further configured to:
set a corresponding relationship between detection priorities and a combination of one or more predetermined detection programs; and determine the detection priorities of the URL based on the a referenced value of the URL; and
call a corresponding combination of one or more predetermined detection programs based on the detection priorities to perform malicious detection attribute of the URL.

12. The system of claim 7, wherein the crawled web page is specified in a plurality of the acquired webpage query requests.

13. A non-transitory computer-readable storage medium having computer-executable instructions, wherein the computer-executable instructions, when executed by one or more computer processors, cause the one or more computer processors to:
acquire webpage query requests submitted by a plurality of clients;
crawl the webpage based on the acquired webpage query requests and acquiring crawled webpage contents;
count up a referenced value of a uniform resource locator (URL) based on the crawled webpage contents; and
call a predetermined detection program based on the referenced value of the URL to perform malicious attribute detection of the URL.

14. The non-transitory computer-readable storage medium of claim 13, wherein the computer-executable instructions further comprise instructions for:
after acquiring crawled webpage contents, parsing the webpage contents and extracting citation information of external links in the webpage contents;
wherein counting up the referenced value of the URL based on the webpage contents comprises:
counting up the referenced value of the URL based on citation information of the external links.

15. The non-transitory computer-readable storage medium of claim 13, wherein counting up the referenced value of the URL based on the citation information of the external links comprises: classifying URLs by domain name based on domain information, and counting up referenced values of the URLs under different domain categories based on the citation information of the external links.

16. The non-transitory computer-readable storage medium of claim 13, wherein the computer-executable instructions further comprise instructions for:
setting a corresponding relationship between detection priorities and a combination of one or more predetermined detection programs;
wherein calling the predetermined detection program to perform malicious attribute detection of the URL comprises:
determining the detection priorities of the URL based on the referenced value of the URL; and
calling a corresponding combination of one or more predetermined detection programs based on the detection priorities to perform malicious attribute detection of the URL.

17. The non-transitory computer-readable storage medium of claim 13, wherein the computer-executable instructions further comprise instructions for:
after acquiring crawled webpage contents, parsing the webpage contents and extracting data to be detected in the webpage contents;
wherein calling a predetermined detection program based on the referenced value of the URL to perform malicious attribute detection of the URL comprises:
calling a predetermined detection program based on the referenced value of the URL to perform malicious attribute detection of contents referenced by the URL.

18. The non-transitory computer-readable medium of claim 13, wherein the crawled web page is specified in a plurality of the acquired webpage query requests.

\* \* \* \* \*